United States Patent [19]

Inoue et al.

[11] Patent Number: 5,307,215
[45] Date of Patent: Apr. 26, 1994

[54] METHOD AND DEVICE FOR LOADING TAPE IN MAGNETIC RECORDER

[75] Inventors: Atsushi Inoue, Chigasaki; Nobuyuki Kaku, Yokohama; Yasuo Inagaki; Toshihide Murata, both of Katsuta, all of Japan

[73] Assignee: Hitachi, Ltd, Tokyo, Japan

[21] Appl. No.: 683,875

[22] Filed: Apr. 11, 1991

[30] Foreign Application Priority Data

Apr. 13, 1990 [JP] Japan ............................ 2-96431
Jul. 25, 1990 [JP] Japan ............................ 2-194889

[51] Int. Cl.⁵ ........................ G11B 5/027; G11B 15/18
[52] U.S. Cl. ........................ 360/71; 360/85; 360/95
[58] Field of Search ............. 360/71, 85, 95; 242/197, 202

[56] References Cited

U.S. PATENT DOCUMENTS

| 4,398,227 | 8/1983 | Anderson | 360/71 |
| 4,417,287 | 11/1983 | Ishikura | 360/71 |
| 4,642,706 | 2/1987 | Vollmann et al. | 360/95 |
| 4,758,912 | 7/1988 | Yoshihiro et al. | 360/85 |
| 5,164,868 | 11/1992 | Mosher et al. | 360/85 |

FOREIGN PATENT DOCUMENTS 62-243152 10/1987 Japan .
63-850 1/1988 Japan .
63-69055 3/1988 Japan .
63-224063 9/1988 Japan .
63-225954 9/1988 Japan .

Primary Examiner—William L. Sikes
Assistant Examiner—Toan Tran
Attorney, Agent, or Firm—Antonelli, Terry, Stout & Kraus

[57] ABSTRACT

A tape loading device for loading a tape onto a recording drum, comprises, a pair of rotational reel spindles, the reel spindles supporting respective reels on which the tape is wound and between which the tape extends, a spindle drive for applying torque to the reel spindles so that the tape between the reels runs on the recording drum and a tension is applied to the tape between the reels, and tape withdrawing device for withdrawing the tape from the reels so that the tape between the reels moves toward the recording drum and contacts with the recording drum. The spindle drive applies a first tension to the tape between the reels in a first step where the tape withdrawing device move the tape between the reels toward the recording drum, the spindle drive increases the tension of the tape from the first tension to a tension greater than the first tension in a second step where the tape does not contact with the recording drum. The tape withdrawing device makes the tape between the reels contact with the recording drum with the tension of the tape greater than the first tension in a third step after the second step.

17 Claims, 17 Drawing Sheets

METHOD AND DEVICE FOR LOADING TAPE IN MAGNETIC RECORDER

BACKGROUND OF THE INVENTION AND RELATED PRIOR ART STATEMENT

The present invention relates to a method and device for loading a tape in a magnetic recorder, more particularly, a method and device for loading a magnetic tape onto a recording drum.

In conventional cassette-type magnetic recorders described, for example, in Japanese Patent Unexamined Publications 63-850 and 63-69055, moving bases including tape guides with flanges at upper and lower ends thereof and inclined tape guides move along guide plates arranged around a rotational head drum so that tape is withdrawn from a tape cassette and is wound and loaded on a circumferential surface of the rotational head drum.

OBJECT AND SUMMARY OF THE INVENTION

The object of the present invention is to provide a method and device for loading a tape onto a recording drum in a short time while maintaining an accuracy and position and attitude of the tape.

According to the present invention, a tape loading device for loading a tape onto a recording drum includes a pair of rotational reel spindles, with each of the reel spindles supporting a reel on which the tape is wound. A spindle driving means applies a torque to the reel spindles so that the tape extending between the reels runs on the recording drum and a tension of the tape is generated between the reels. A tape withdrawing means withdraws the tape from the reels to that the tape extending between the reels moves toward the recording drum and contacts with the recording drum. The spindle driving means applies a first tension to the tape between the reels in a first step wherein the tape withdrawing means moves the tape between the reels toward the recording drum. The spindle driving means increases the tension of the tape from the first tension to a tension larger than a first tension in a second step where the tape does not contact with the recording drum. The tape withdrawing means makes the tape between the reels contact the recording drum with the tension of the tape larger than the first tension in a third step after the second step.

According to the present invention, a method for loading a tape onto a recording drum from reels on which the tape is wound includes moving the tape between the reels toward a recording drum and applying a first tension to the tape between the reels, with the tape between the reels beginning to be brought into contact with the recording drum with a tension greater than the first tension.

Since the tension of the tape extending between the reels is small when the tape between the reels is moved toward a recording drum, the tape extending between the reels can move smoothly at a high speed toward the recording drum and a damage of the tape by a large tension of the tape on the guides of the tape withdrawing means is prevented. On the other hand, since the tension of the tape is large when the tape between the reels begins to be brought into contact with the recording drum, a position and attitude of the tape is accurately maintained on the guides of the tape withdrawing means so that the tape can be brought into accurate contact with a predetermined position on the recording drum, and an undesirable vibration of the tape on the recording drum is prevented. Therefore, a high-speed and accurate tape loading operation is carried out.

DETAILED DESCRIPTION OF PREFERRED EMBODIMENTS

Figure 2:
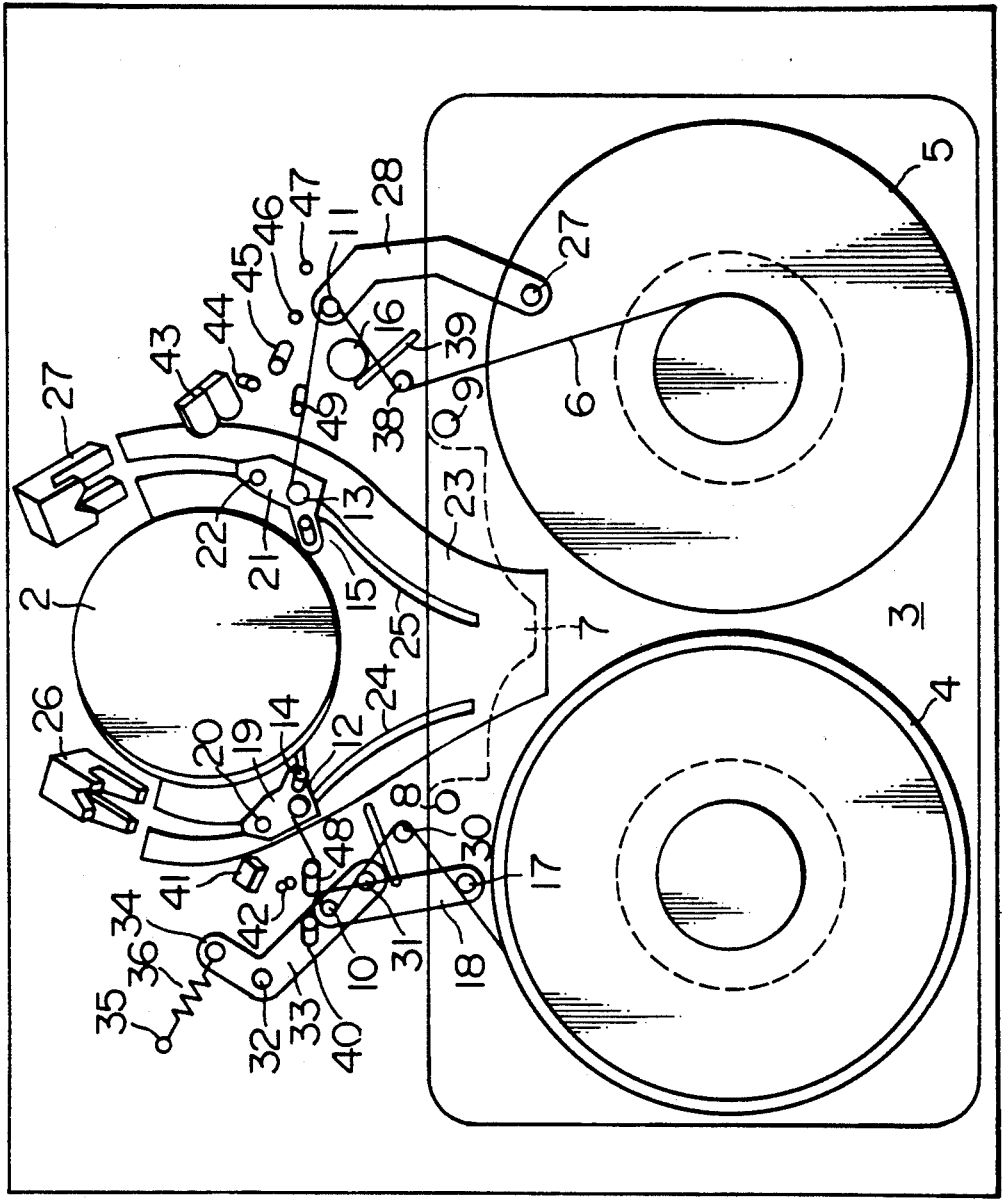
FIG. 2 is a schematic plan view of an arrangement of a tape loading device according to the present invention prior to a tape loading operation.
Figure 3:
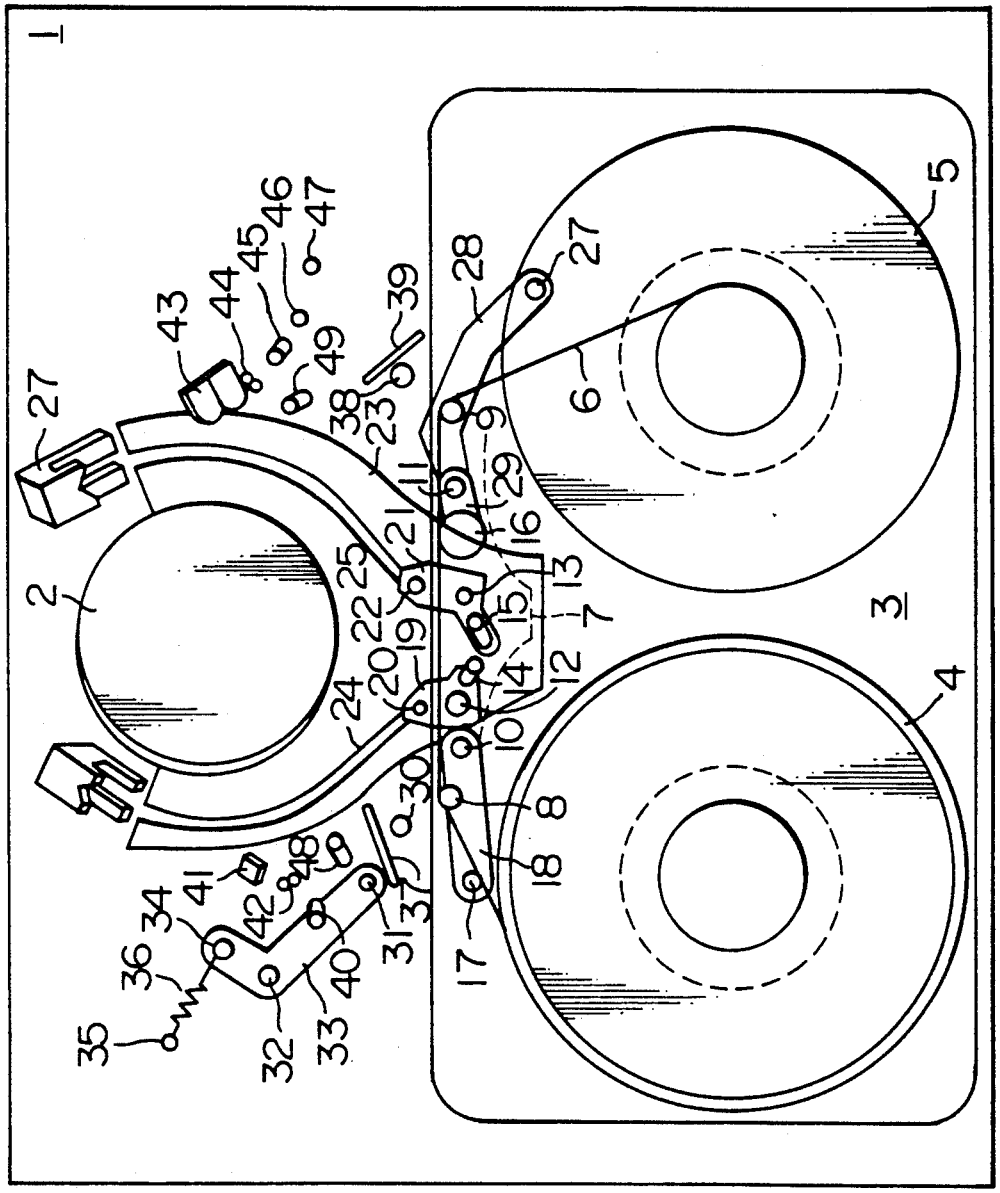
FIG. 3 is a schematic plan view of the arrangement of the embodiment of FIG. 2 after a completion of the tape loading operation.

Referring now to the drawings wherein like reference numerals are used throughout the various views to designate like parts and, more particularly, to FIG. 2, according to this figure, a rotational head drum includes a rotational magnetic head for magnetically recording or reproducing information on a magnetic tape 6. A cassette 3 receives rotational reels 4, 5 on which the tape 6 is wound. A part of the tape 6, extending between the reels 4, 5, is arranged in an opening 7 at a forward part of the cassette 3. After the cassette is set into a predetermined position relative to a tape loading device, a tape supply side withdrawing guide 10, a tape guide 12 and inclined tape guide 14 mounted on a moving base 19 moving at a supplying side of the rotational head drum 2, an inclined tape guide 15 and a tape guide 13 mounted on a moving base 21 moving at a winding side of the rotational head drum 2, a pinch roller 16 and a tape winding side withdrawing guide 11, are inserted into the opening 7, the moving bases 19, 21 are driven by a driving motor 106 to move along respective guide grooves 24, 25 arranged on a guide plate 23. Upon a completion of the tape loading operation, the moving bases 19, 21 are fixedly positioned by fixing devices 26, 27 arranged at respective sides of the head drum 2 so that the tape 6 can be set on the head drum 2.

Figure 4:
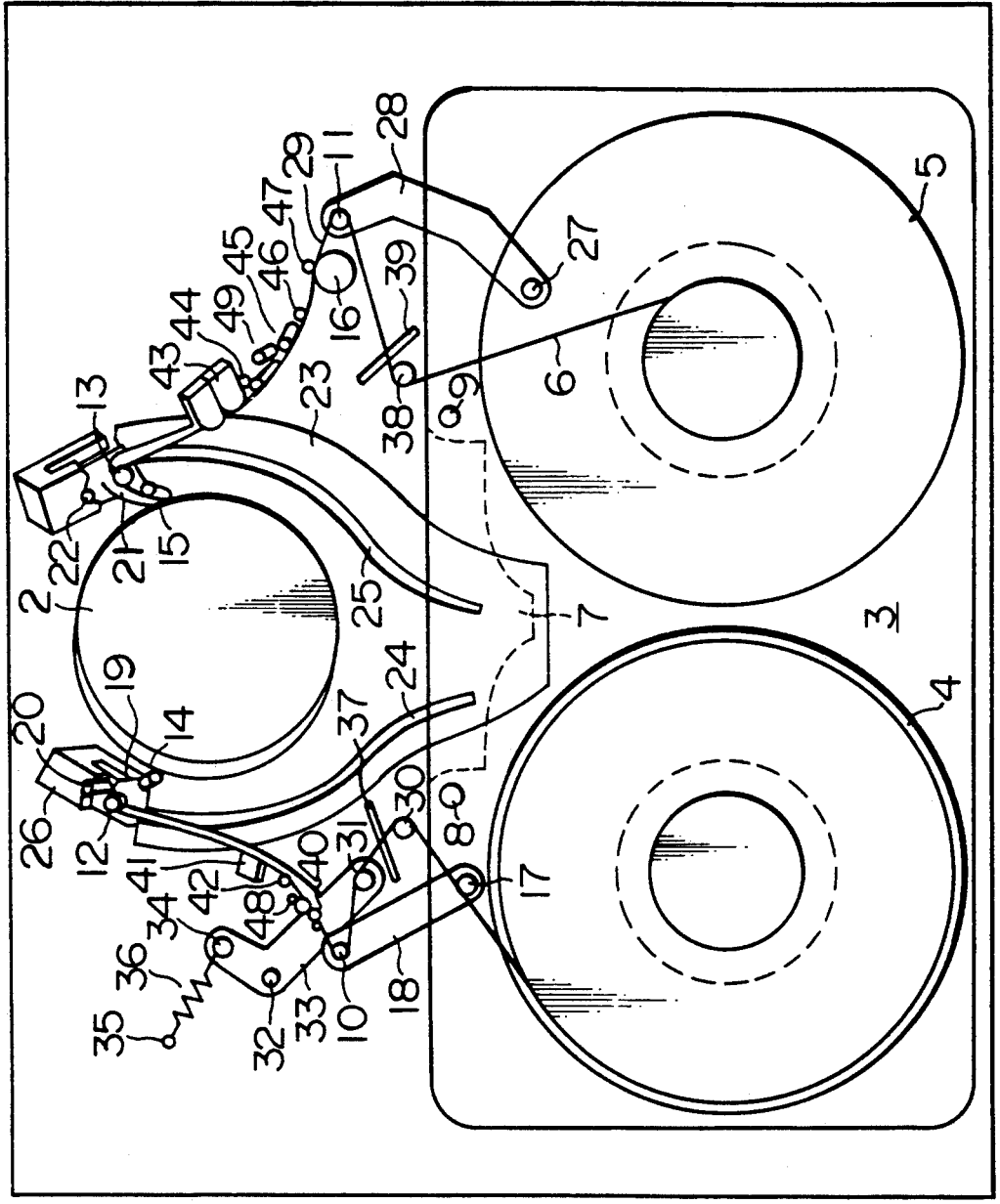
FIG. 4 is a schematic plan view of the arrangement of the embodiment of FIG. 2.

The tape supply side withdrawing guide 10 is driven by the driving motor 106 to be positioned at a position shown in FIG. 4 so that a tape path of the tape supply side is formed. The tape 6 is wound on a tape supply guide 30 and a tension pin 31 for measuring a tape tension and is brought into contact with an inclined tape guide 40, a tape guide 42 and an entire width eliminator 41 by the withdrawing guide 10. Subsequently, the tape is wound on the head drum by the tape guide 12 and inclined tape guide 14 mounted on the moving base 19.

When the tape winding side withdrawing guide 11 is being driven by the driving motor 106 to be positioned at a position shown in FIG. 4, the tape 6 extends on the head drum 2 and the inclined tape guide 15 and tape guide 13 mounted on the moving base 21, is brought into contact with the A/C head 43 and is wound on a tape guide 44, inclined tape guide 45 and tape guide 46, and reaches the cassette 3 through a capstan 47, the tape winding side withdrawing guide and a tape guide 38, so that the tape 6 returns to the cassette 3 through the head drum 2.

As shown in FIG. 4, a tape path is deflected horizontally and vertically by the inclined tape guides 40, 14, 15 and 45, and the tape 6 is pressed against the capstan 47 by the pinch roller 16 to be driven by the capstan 47 rotated by a capstan motor (not shown), upon a completion of the tape loading operation In FIGS. 5-9, a tape supplying side locating ring 51 includes a slide plate 52 which is connected to the tape supplying side moving base 19 through a connecting plate 56. A spring (not shown) is arranged between the slide plate 52 and the loading ring 51 to urge the slide plate 52 in a direction on the loading ring 51 so that the moving base 19 is pressed by the spring to be positioned when the loading ring 51 continues to be rotated against a force of the spring after the moving base 19 reaches an end of the groove of the guide plate. At the tape winding side, a similar structure is arranged.

The tape supplying side loading ring 51 and a tape winding side loading ring 57 are supported by respective combinations of support members 53, 54 and 55 and of support members 62, 63 and 64 coaxially with respect to the head drum 2. A height of the tape supplying side loading ring 51 is different from that of the tape winding side loading ring 57. Both of the tape supplying side loading ring 51 and the tape winding side loading ring 57 are driven by the driving motor 106 through a cam gear 50 to run around the head drum 2. A rotational direction of the tape supplying side loading ring 51 is opposite to that of the tape winding side loading ring 57 by counter gears 59, 60 and 61. A potentiometer 103 measures a progress of movement of the tape withdrawing mechanism.

Figure 5:
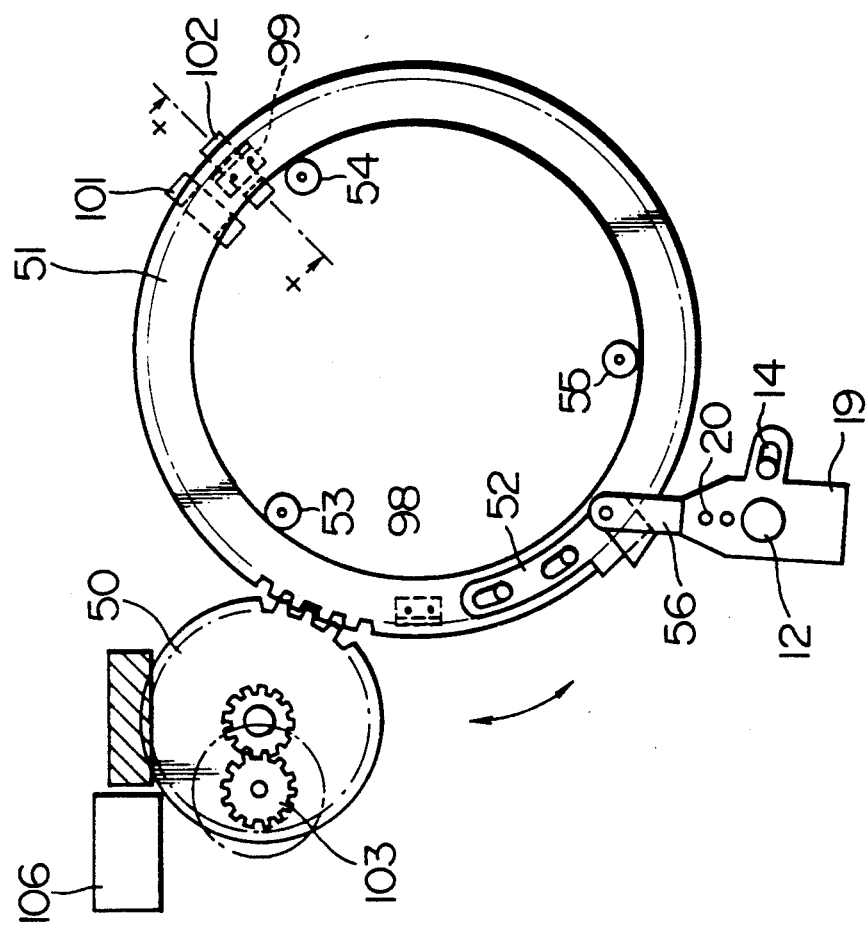
FIG. 5 is a schematic plan view of a tape withdrawing mechanism used in the embodiment of the present invention.
Figure 6:
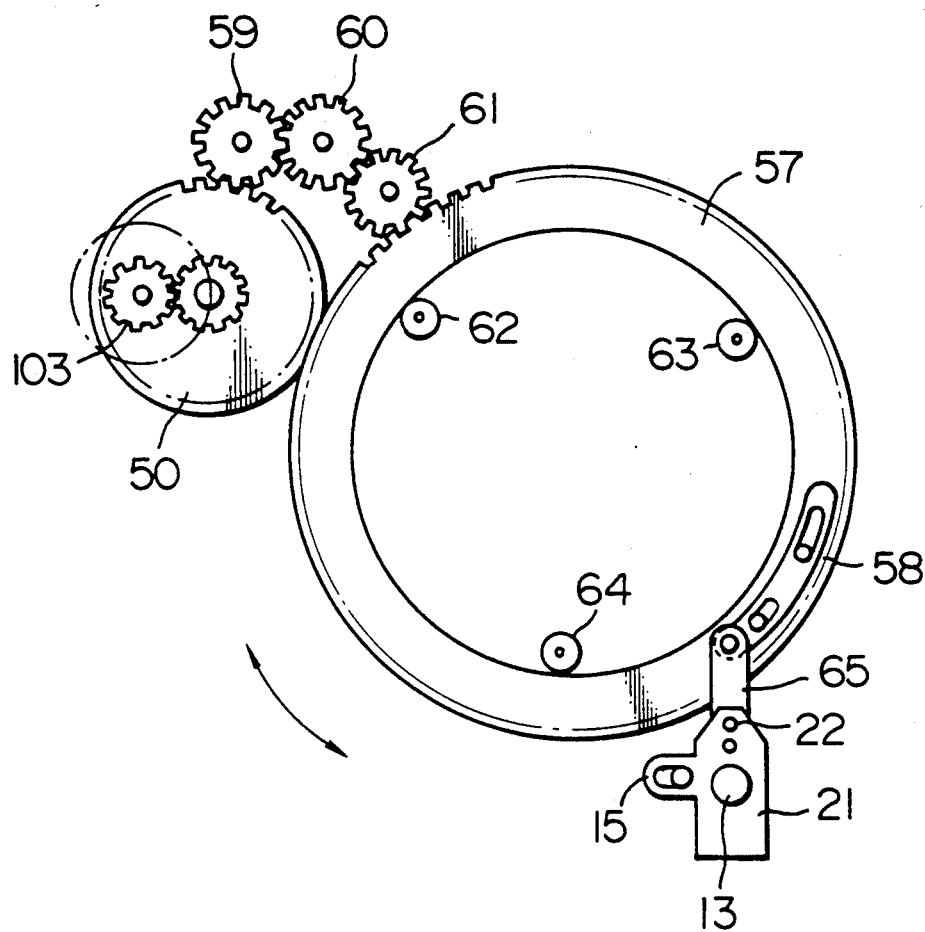
FIG. 6 is a schematic plan view showing the tape withdrawing mechanism used in the embodiment of the present invention.
Figure 7:
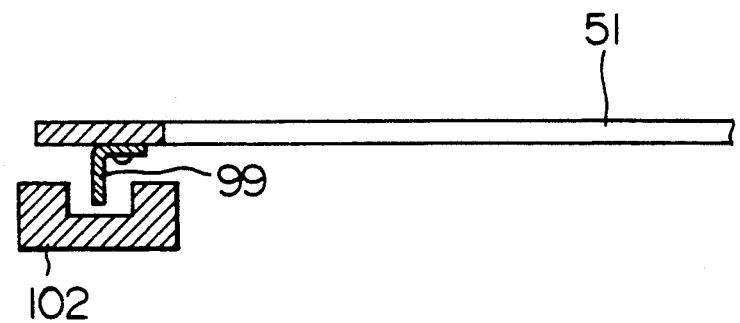
FIG. 7 is a partial cross-sectional view of a detector for detecting a completion of a loading or unloading operation.

Sensors 101 and 102, arranged under the tape supplying side loading ring 51, as shown in FIG. 5, detect completions of loading and unloading operations when shutters 98 and 99, arranged on a reverse side of the tape supplying side loading ring 51, as shown in FIG. 7, exist on the sensors 101 and 102

Figure 8:
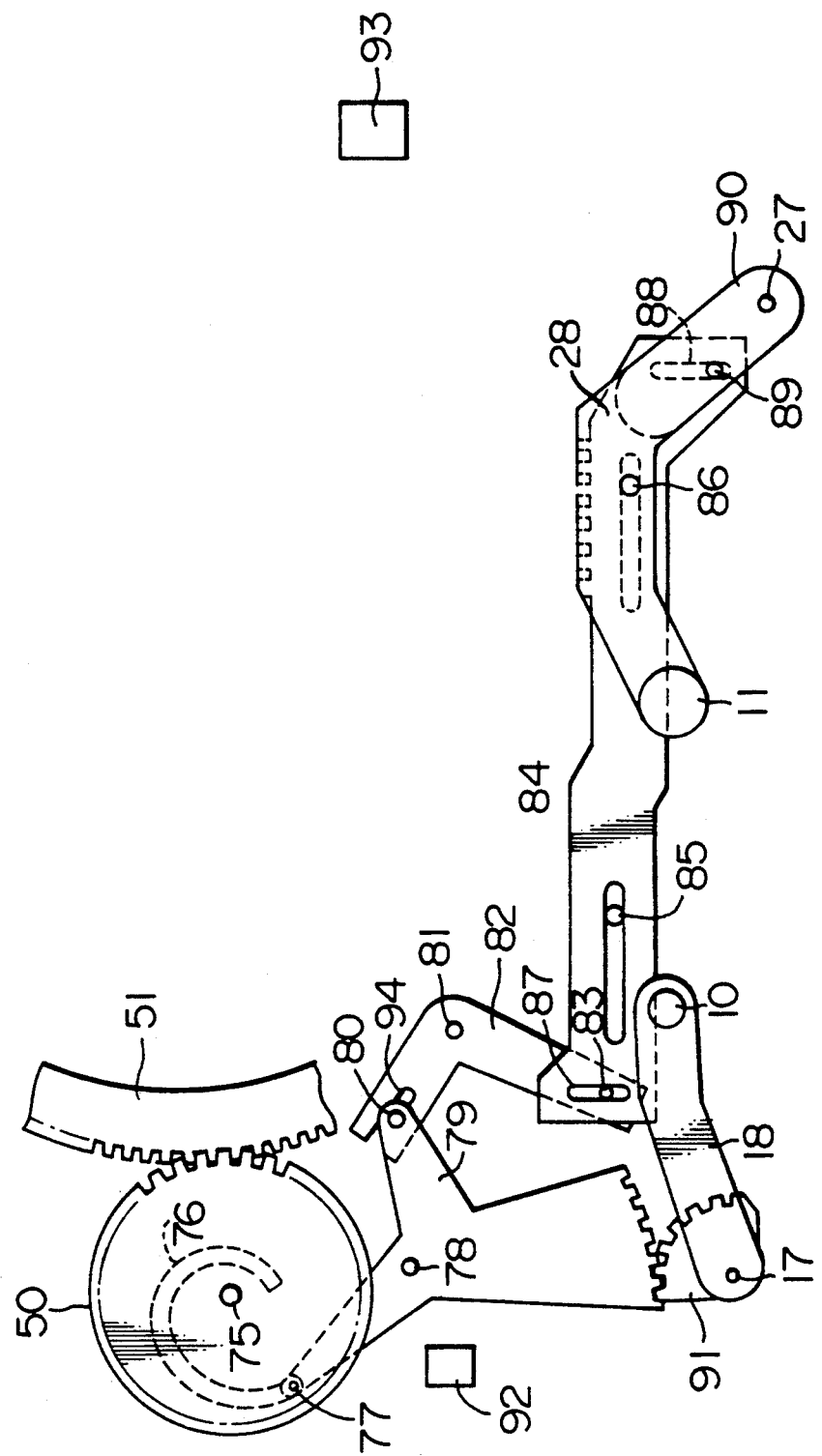
FIG. 8 is a schematic plan view of a tape withdrawing mechanism used in the embodiment of the present invention.
Figure 9:
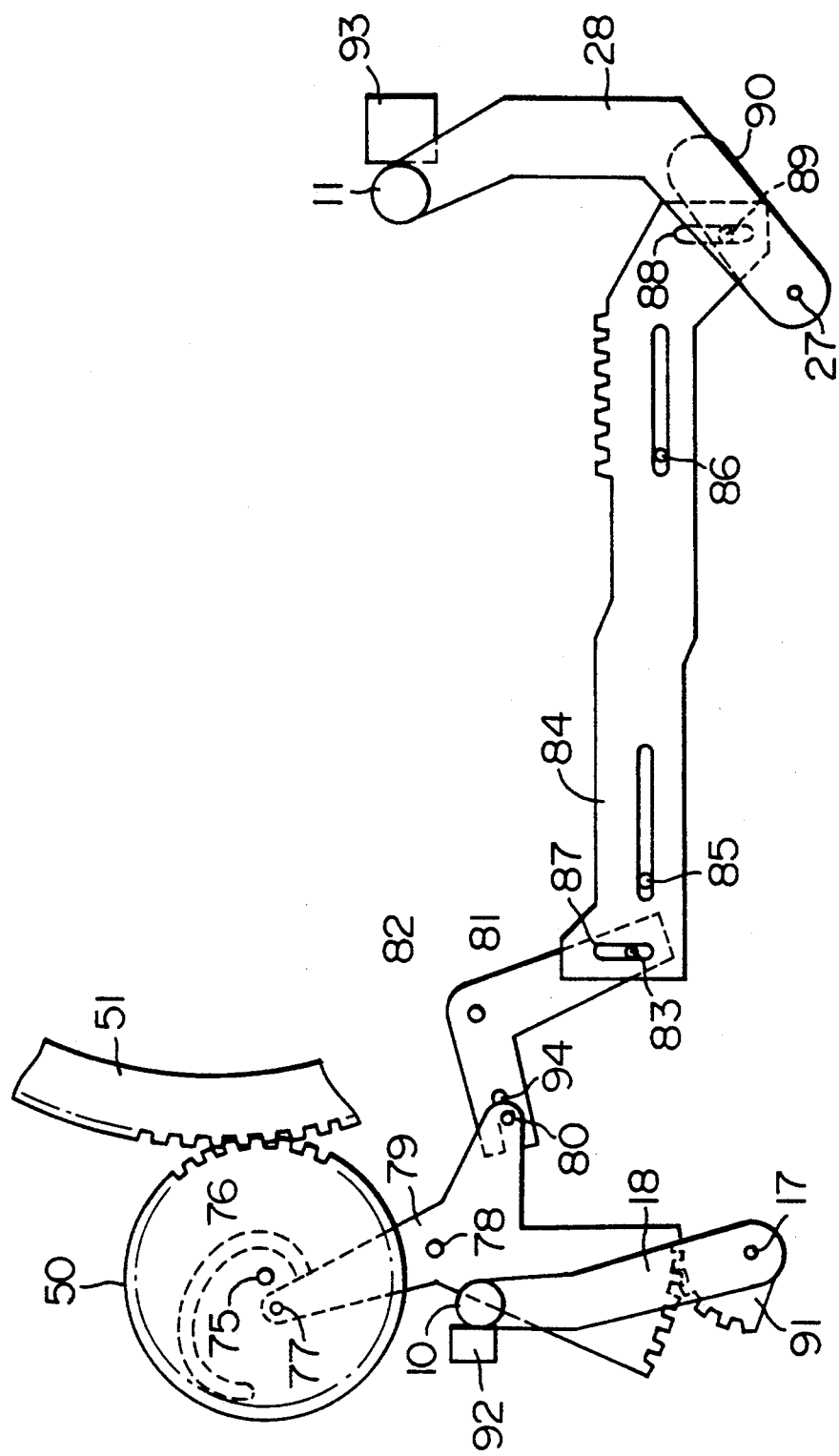
FIG. 9 is a schematic plan view showing the tape withdrawing mechanism used in the embodiment of the present invention.

As shown in FIGS. 8 and 9, the driving motor 106 drives the cam gear 50 to rotate in a tape loading direction around a rotational support panel 75 so that a driving arm 79, including a fan-shaped gear at an end thereof, is rotated around a rotational support point 78 by a cam groove 76 arranged on a lower surface of the cam gear 50. The fan-shaped gear of the driving arm 79 engages with a gear 91 which is fixed to a withdrawing arm 18 with the tape supply side withdrawing guide 10 so that the gear 91 and the withdrawing arm 18 with the tape supply side withdrawing guide 10 rotate on a rotational support point 17. The driving arm 79 is connected to a L-shaped connecting arm 82 through a pin 80 at an end of the driving arm 79. The connecting arm 82 is connected to a slider 84 through a pin 83 an end of the connecting arm 82. When the slider is driven to slide, a withdrawing arm 28 is rotated so that the tape winding side withdrawing guide 11 rotates to withdraw the tape 6. When the tape 6 is unloaded, an operation opposite to the above operation is carried out.

A rotational degree of the cam gear 50 is measured by the potentiometer 103 connected fixedly to the cam gear 50 to that a progress of loading-unloading movement of the tape withdrawing mechanism is detected.

Figure 1:
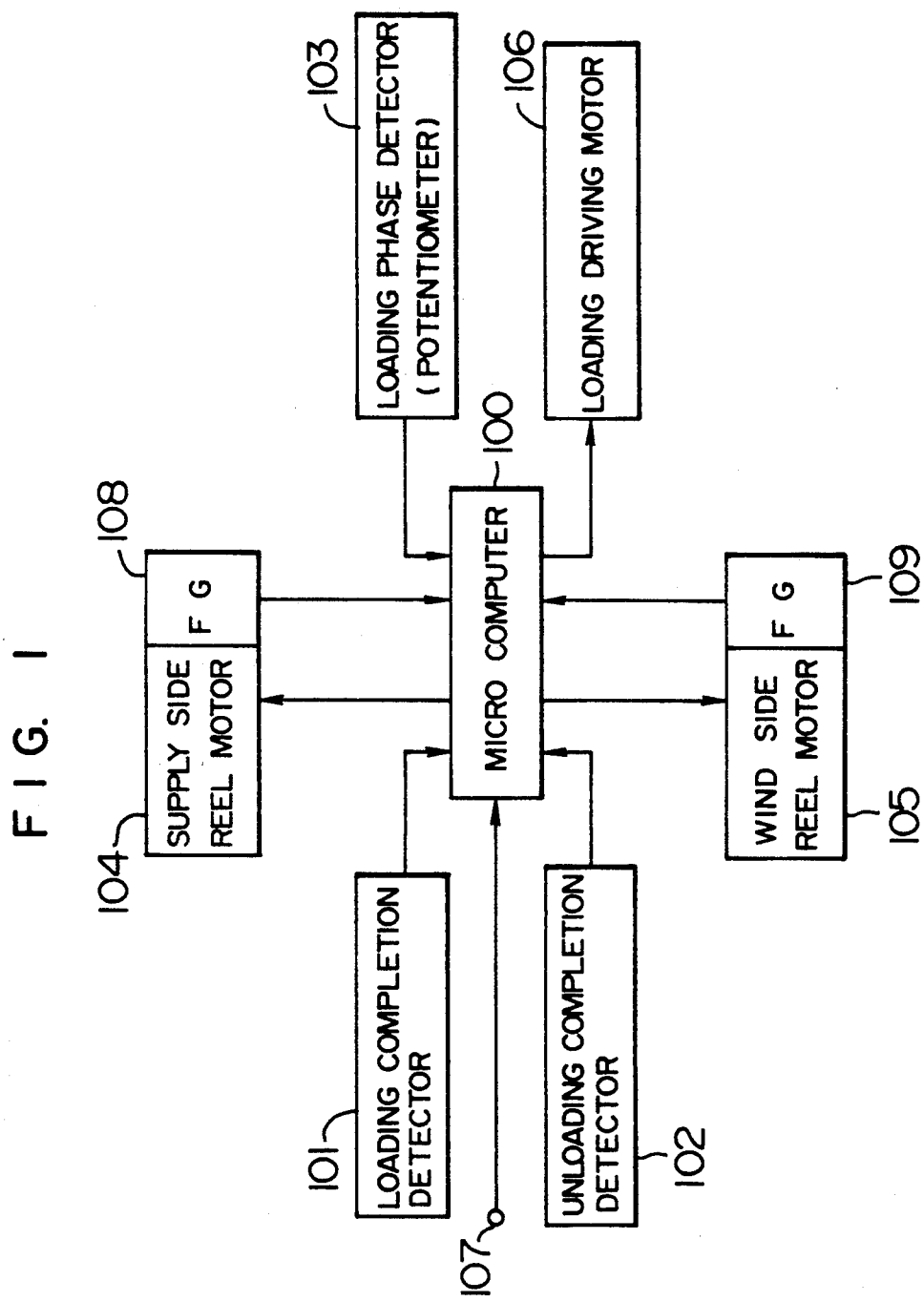
FIG. 1 is a block diagram of an embodiment of a tape loading device according to the present invention during a tape loading operation.
Figure 10:
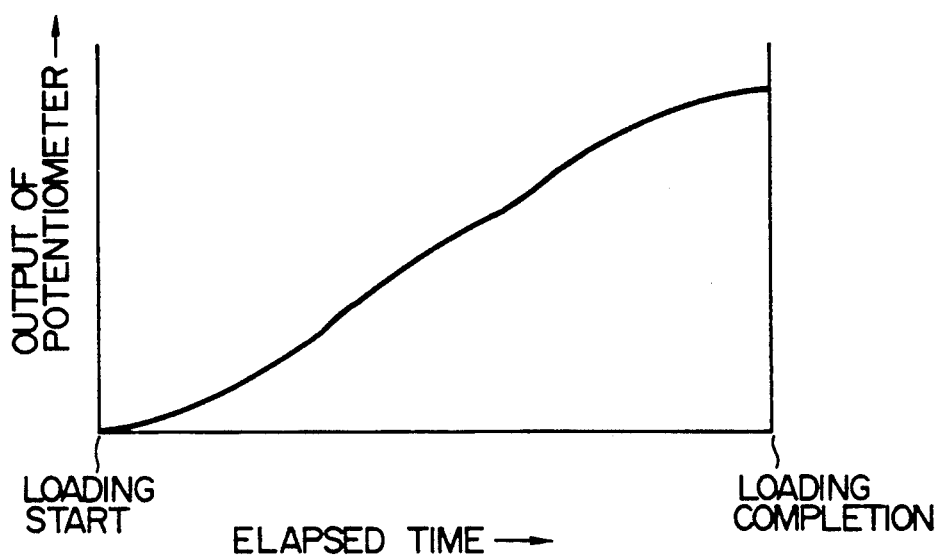
FIG. 10 is a graphical illustration of a relationship between a progress of a tape loading operation of the tape withdrawing mechanism and elapsed time from a start of the tape loading operation of the tape withdrawing mechanism, in the embodiment of the present invention.
Figure 11:
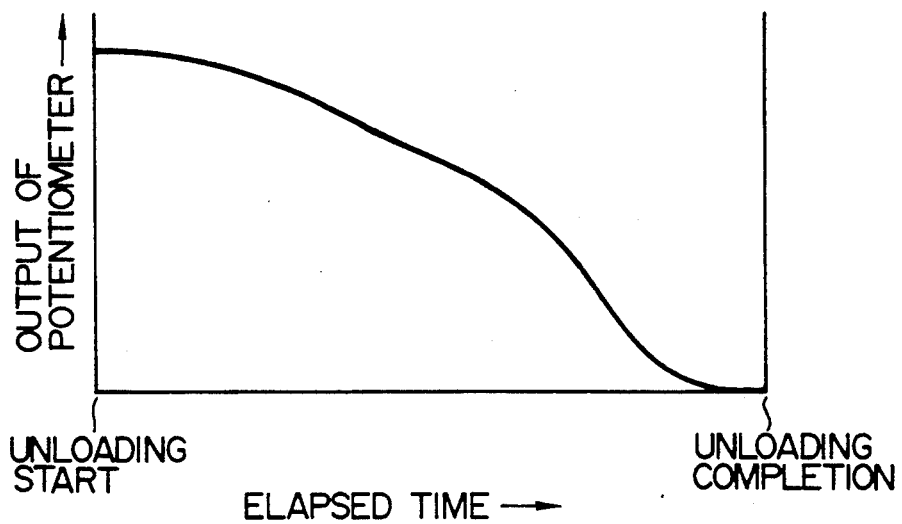
FIG. 11 is a graphical illustration of a relationship between a progress of a tape unloading operation of the tape withdrawing mechanism and elapsed time from a start of the tape unloading operation of the tape withdrawing mechanism, in the embodiment of the present invention.

As shown in FIG. 1, output signals from the loading completion sensor 101, the unloading completion sensor 102, the potentiometer 103, and pulse generators 108 and 109 generating pulse signals in accordance with the rotation of a tape supply side reel driving motor 104 and tape winding side reel driving motor 105 are inputted into a microcomputer 100. As shown in FIGS. 10 and 11, the progress of loading-unloading movement of the tape withdrawing mechanism is controlled by the microcomputer 100 through the driving motor 106 in accordance with the lapsed time from a start of loading-unloading movement of the tape withdrawing mechanism. The output signal of the potentiometer 103 is initialized with 0 when the sensor 102 detects the unloading completion and increases in accordance with the progress of the tape loading operation. The output signal of the potentiometer 103 is initialized with 0 when the sensor 101 detects the loading completion and increases in accordance with the progress of the tape unloading operation. The microcomputer 100 controls the tape supply side reel driving motor 104 and tape winding side reel driving motor 105 to adjust torques thereof in accordance with the output signals from the potentiometer 103 on the basis of a predetermined relationship between a desirable tension of the tape 6 and the progress of loading-unloading movement of the tape withdrawing mechanism so that the tape tension is kept at a predetermined degree during the loading-unloading operation. Completion of the loading and unloading operations are detected when the loading completion sensor 101 and the unloading completion sensor 102 outputs completion signals.

During a predetermined time period P between a finish of setting the cassette 3 and a start of the tape loading operation or of loading movement of the tape withdrawing mechanism, the tape supply side reel driving motor 104 and tape winding side reel driving motor 105 generate even torques so that the tape 6 is moved slightly between the tape winding side reel 5 and the tape supply side reel 4. On the basis of the output signals from the pulse generators 108 and 109, that is, rotational speeds and directions of the tape supply side reel driving motor 104 and tape winding side reel driving motor 105, a rate between a diameter of the tape 6 wound on the tape winding side reel 5 and the diameter of the tape 6 wound on the tape supply reel side 4 can be calculated. Subsequently, a rate between the torque generated by the tape supply side reel driving motor 104 and the torque generated by the tape winding side reel driving motor 105 is adjusted so that a rate of the diameter of the tape 6 wound on the tape winding side reel 5 to the diameter of the tape 6 wound on the tape supply side reel 4 is substantially equal to a rate of the torque generated by the tape winding side reel driving motor 105 to the torque generated by the tape supply side reel driving motor 104.

Figure 12:
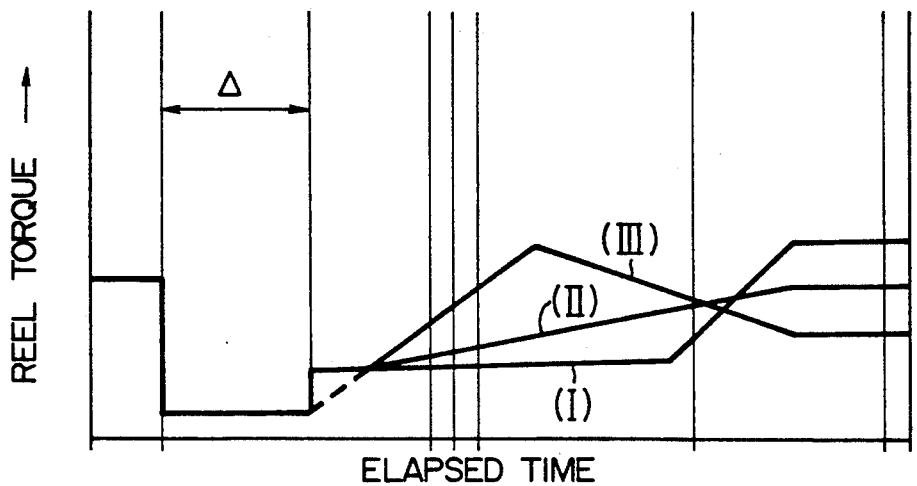
FIG. 12 is a graphical illustration of a relationship between a torque applied to reels to generate a tension in the tape and elapsed time from the start of the tape loading operation of the tape withdrawing mechanism in the embodiment of the present invention.
Figure 13:
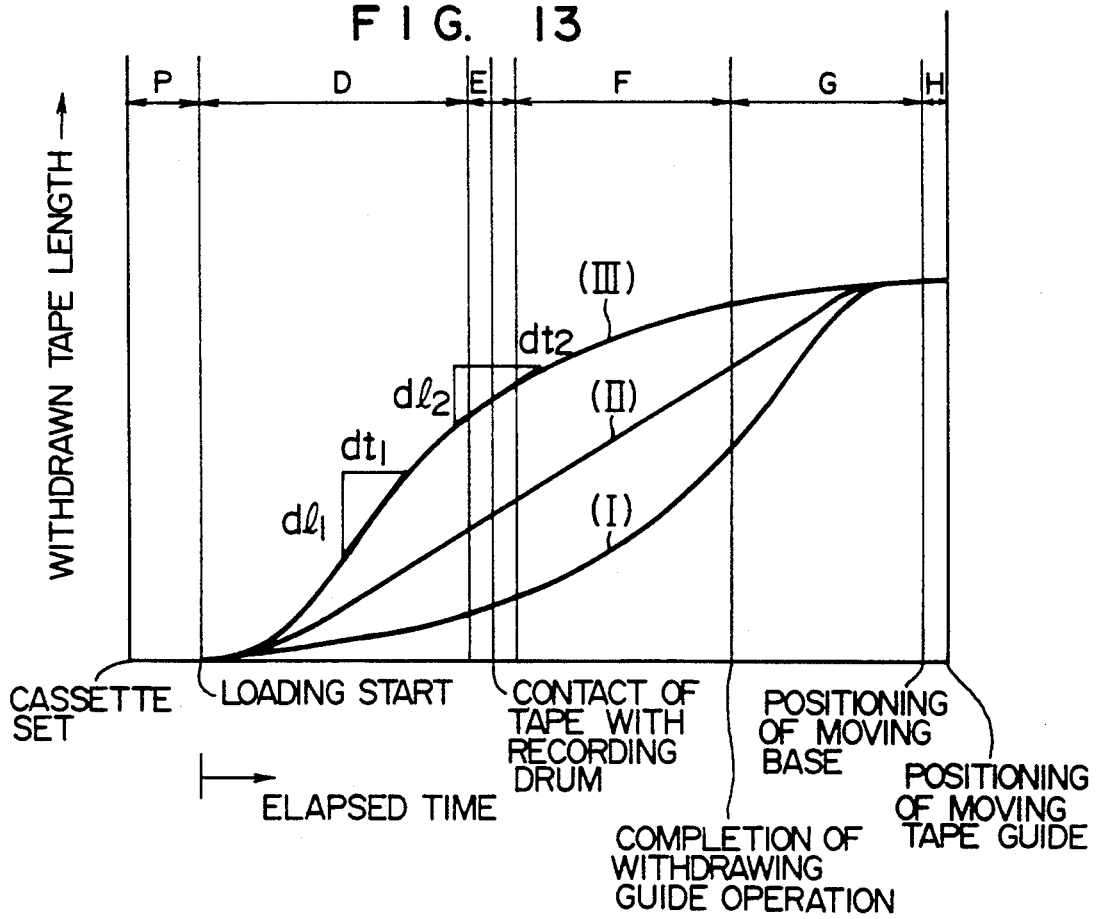
FIG. 13 is a graphical illustration of a relationship between a withdrawn length of tape from the reels and elapsed time from the start of the tape loading operation of the tape withdrawing mechanism in the embodiment of the present invention.

As shown in FIGS. 12 and 13, a time distance D starts simultaneously with a start of the loading operation of the tape withdrawing mechanism and ends just before the tape 6, withdrawn from the cassette 3, begins to contact the head drum 2. During a time period $\Delta$ in the time period D, the loading movement of the tape withdrawing mechanism is started with a predetermined torque rate of the tape winding side reel driving motor 105 and the tape supply side reel driving motor 104 as described above. Since tape lengths withdrawn from the reels 4 and 5 are fixed with respect to the progress of the tape loading operation (the output signals of the potentiometer 103), actual diameters of the tape 6 wound on the tape supply side reel and of the tape wound on the tape winding side reel 5 can be calculated on the basis of the output signals from the pulse generators 108 and 109 (rotational degrees of the tape supply side reel 4 and the tape winding side reel 5) and the output signal from the potentiometer 103. After the time distance $\Delta$, the torques of the tape winding side reel driving motor 105 and the tape supply side reel driving motor 104 are adjusted on the basis of the calculated actual diameters of the tape 6 wound on the tape supply side reel 4 and of the tape wound on the tape winding side reel 5 as shown by solid line in FIG. 12 so that a desirable tension of the tape 6 between the reels 4 and 5 is achieved. During the unloading operation, the torques of the tape winding side reel driving motor 105 and the tape supply side reel driving motor 104 are also controlled in accordance with the progress of the tape unloading operation. In order to prevent a sudden increase in tension of the tape 6 just after the time distance $\Delta$, it is preferable to increase gradually the torques of the tape winding side reel driving motor 105 and the tape supply side reel driving motor 104, as shown by a dotted line in FIG. 12.

The tape 6 begins to contact the head drum 2 during a time period E. A time period F ends when the tape supply side withdrawing guide 10 and the tape wind side withdrawing guides 11 finish their movements. A time period G ends when the moving bases 19 and 21 are positioned at their predetermined end positions. A time period H ends when the loading rings 51 and 52 are positioned at their predetermined end positions to press the moving bases 19 and 21 through the spring against the predetermined end positions.

In a loading case shown as line (I) in FIGS. 12 and 13, a withdrawn tape speed (indicated by an inclination of a tangent line of the line (I)) is accelerated gradually until the time period G and the tape tension in the time period D is equal to the tape tension in the time period E. Therefore, it is difficult to achieve both a large withdrawal tape speed in the time period D and a prevention of tape vibration on the head drum 2 in the time period E.

In a loading operation shown as a line (II) in FIGS. 12 and 13, a withdrawal tape speed is substantially constant during the time periods D, E and F, and the tape tension is increased gradually during the time periods D, E, and F. Therefore, both a large withdrawal tape speed in the time period D and a prevention of tape vibration on the head drum 2 on the time periods E, F and G can be achieved.

In the loading case as shown as a line (III) in FIGS. 12 and 13, a withdrawal tape speed is gradually accelerated during the time period D and is gradually decelerated during the time period F. The tape tension is gradually increased in the time periods D and E and is gradually decreased in the time periods F and G. Therefore, both a larger withdrawal tape speed in the time period D and a prevention of the tape vibration of the head drum 2 in the time periods E, F and G can be achieved.

It is preferable to keep the tape tension at about 10 grams for the large withdrawal tape speed in the time period D and about 20 grams for the prevention of tape vibration on the head drum 2 in the time period E, when a width and thickness of the tape 6 are 19.01 mm and 13 $\mu$m, respectively, a diameter of the tape wound on the reels is 45 to 58 mm and a diameter of the head drum 2 is 96.5 mm. It is also preferable to limit the maximum tape tension to less than 40 g.

Figure 14:
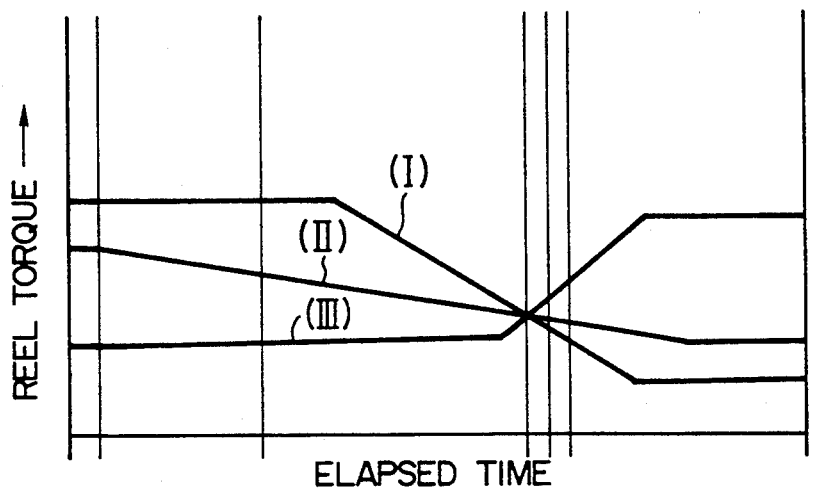
FIG. 14 is a graphical illustration of a relationship between a torque applied to reels to generate a tension in the tape and elapsed time from the start of the tape unloading operation of the tape withdrawing mechanism in the embodiment of the present invention.
Figure 15:
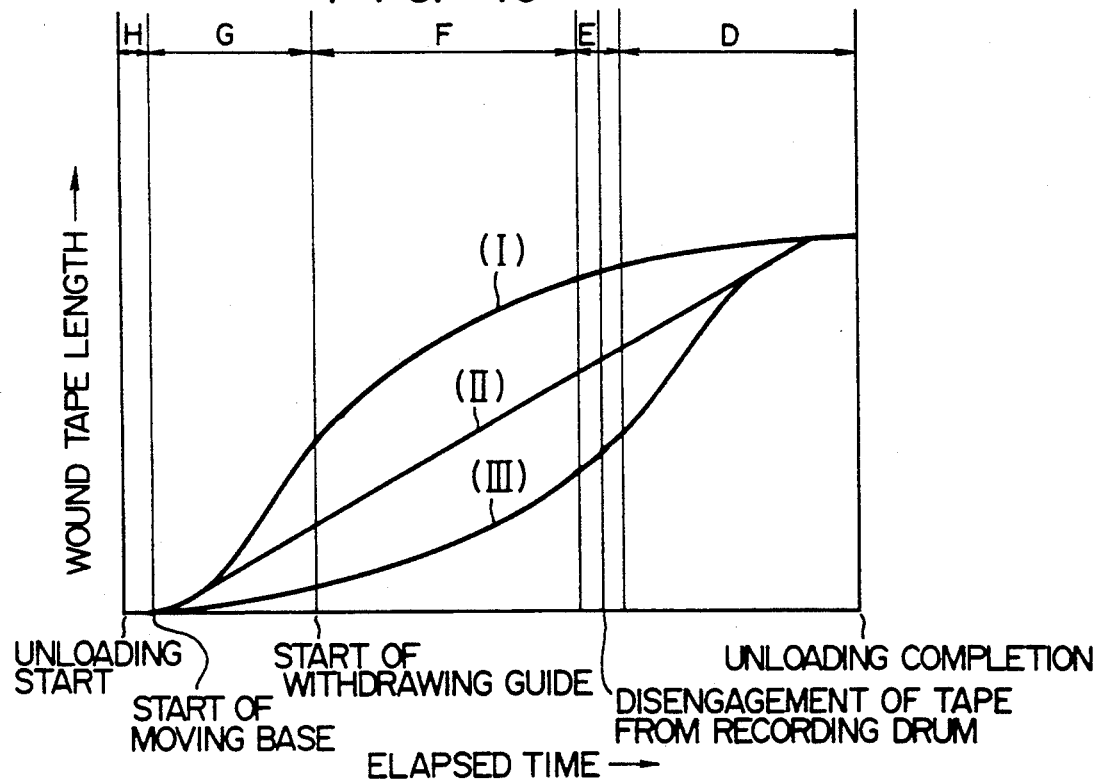
FIG. 15 is a graphical illustration of a relationship between a wound length of tape onto the reels and elapsed time from the start of the tape unloading operation of the tape withdrawing mechanism in the embodiment of the present invention.

In an unloading case shown as a line (I) in FIGS. 14 and 15, a wound tape speed is gradually accelerated in the time period G and is gradually decelerated in the time periods F, E and D. Therefore, the tape tension may be too small in the time period D and the reels 4 and 5 can be stopped smoothly.

In an unloading case as shown as a line (II) in FIGS. 14 and 15, a wound tape speed is substantially constant in the time periods G, F, E and D, and the tape tension gradually decreases in the time period G, F, E and D. Therefore, a difference in tape tension in the distance D and the reels 4 and 5 is small.

In an unloading case as shown as a line (III) in FIGS. 14 and 15, a wound tape speed is gradually accelerated in the time periods G, F and E and decelerated in the time period D, and the tape tension is kept substantially constant in the time periods G and F.

Figure 16:
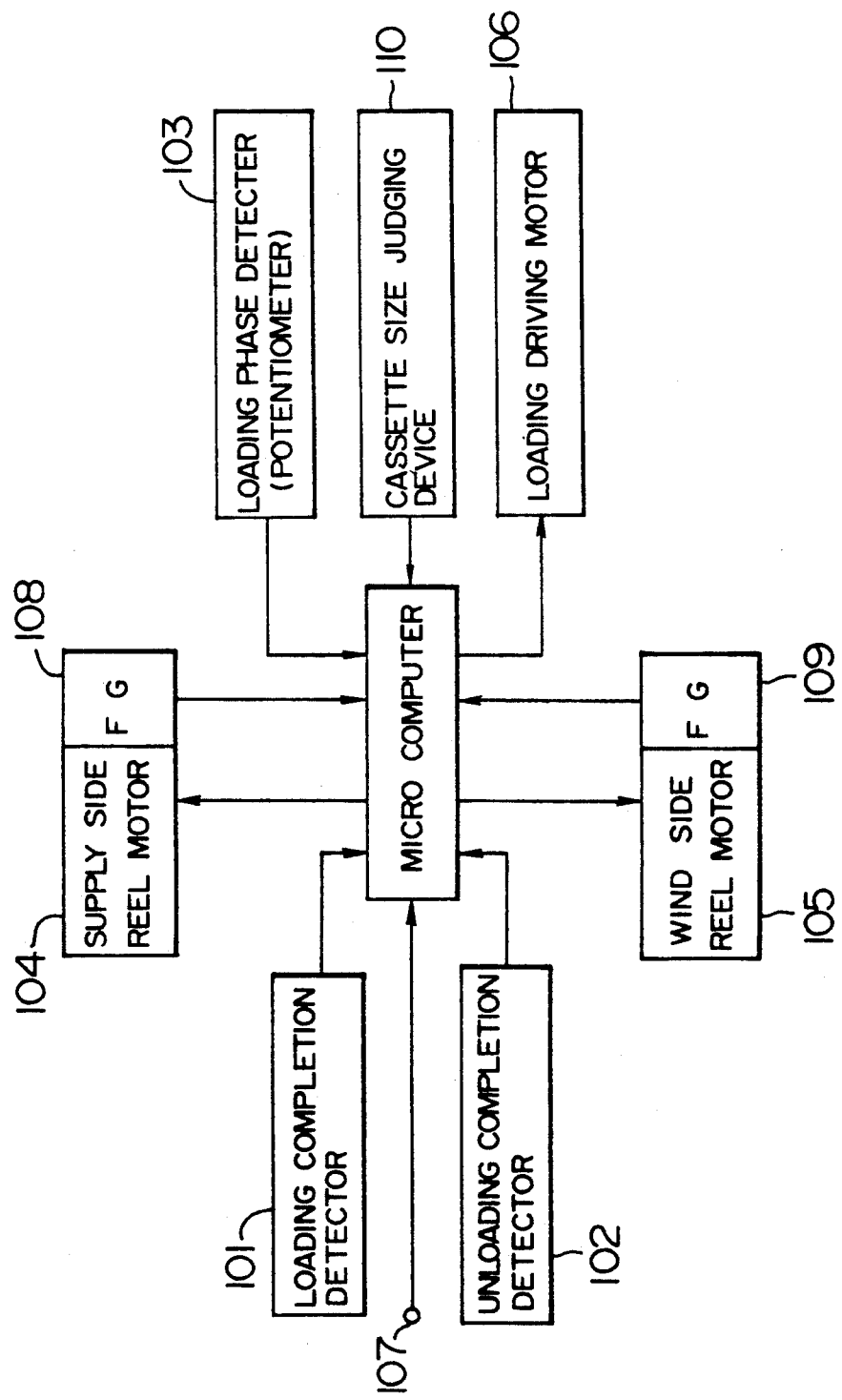
FIG. 16 is a block diagram of another embodiment of the present invention.
Figure 17:
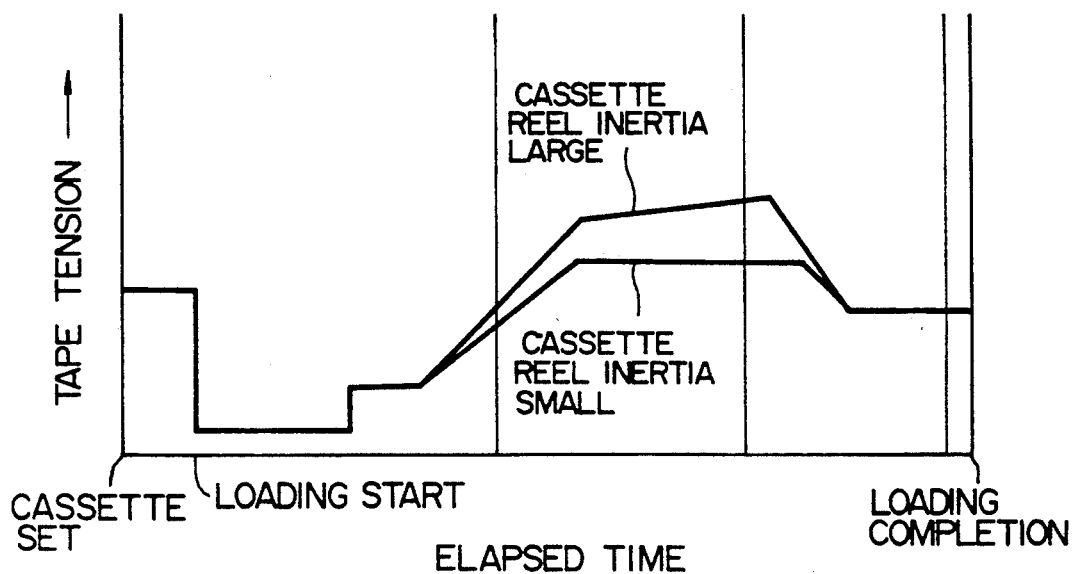
FIG. 17 is a graphical illustration of a relationship between a tape tension and elapsed time from the start of the tape loading operation of the tape winding mechanism in another embodiment of the present invention.
Figure 18:
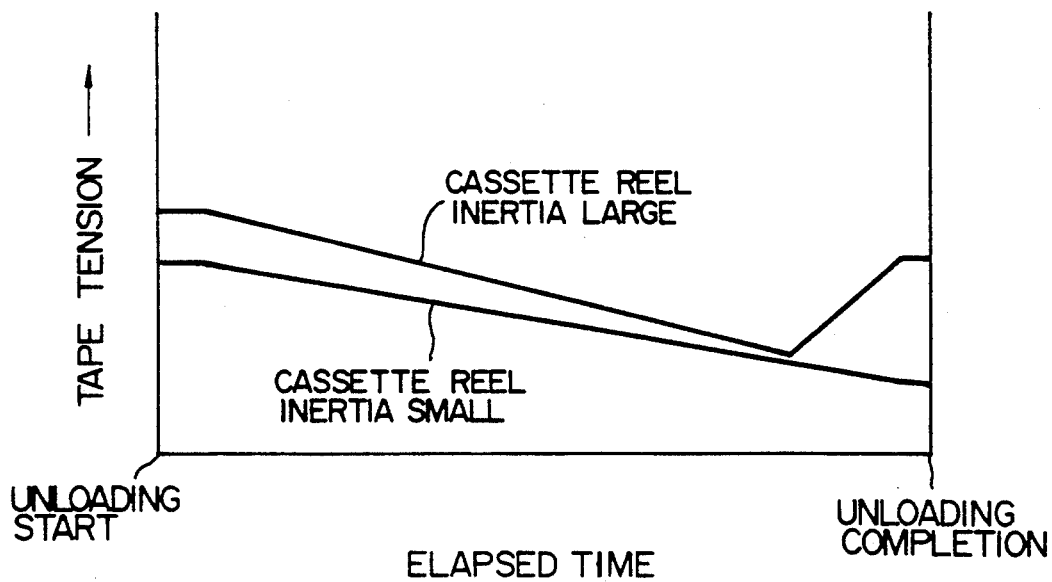
FIG. 18 is a graphical illustration of a relationship between a tape tension and elapsed time from the start of the tape unloading operation of the tape withdrawing mechanism according to the present invention.
Figure 19:
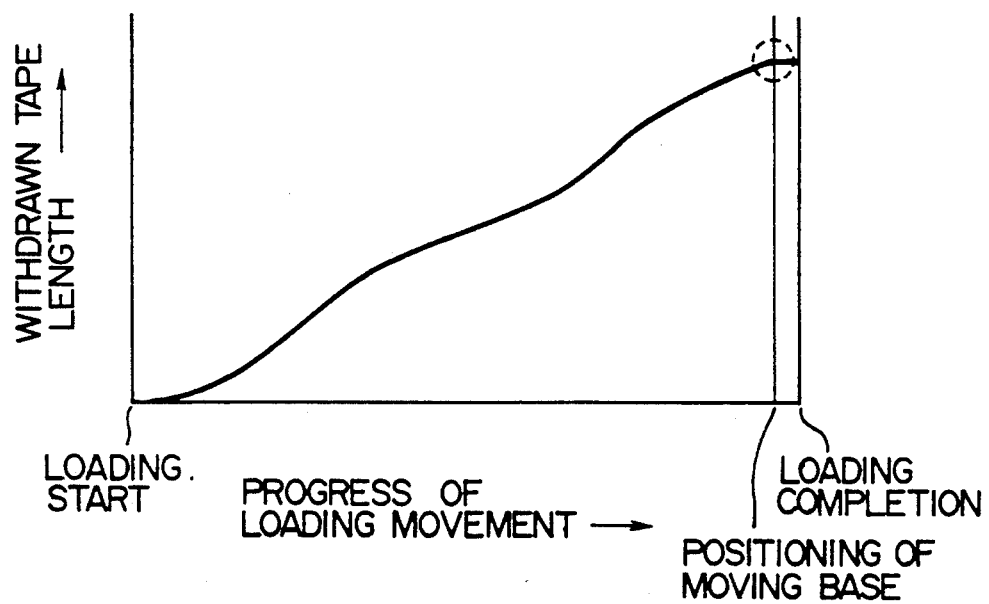
FIG. 19 is a graphical illustration of a relationship between a withdrawn tape from reels and elapsed time from a start of a tape loading operation of a conventional tape withdrawing mechanism.
Figure 20:
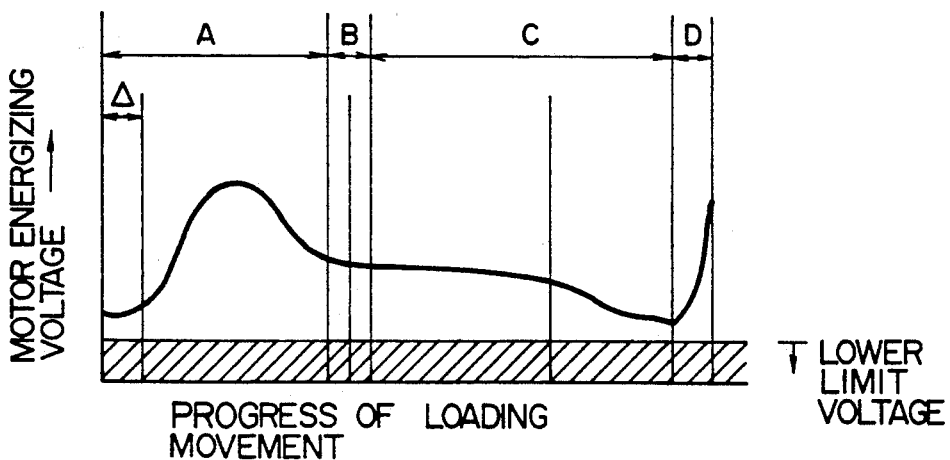
FIG. 20 is a graphical illustration of a relationship between a progress of loading movement of a tape withdrawing mechanism and a voltage energizing a motor for driving the tape withdrawing mechanism in another embodiment of the present invention.

When inertia of the reels 4 and 5 receiving the tape 5 are significantly large, a cassette size measuring device 110 may be combined with the tape loading device, as shown in FIG. 16. The tape tension, that is, the torque of the tape winding side reel driving motor 105 and the tape supply side reel driving motor 104 are changed in accordance with the measured cassette size so that the larger the inertia of the reels 4 and 5, the larger the tape tension as shown in FIGS. 17 and 18. In another embodiment of the tape loading device according to the present invention, after the microcomputer 100 receives a tape loading instruction signal through an input terminal 107, the microcomputer 100 measures the progress of loading movement of the tape withdrawing mechanism on the basis of the output value of the potentiometer 103, and a reference or datum point of the progress of loading movement of the tape withdrawing mechanism is an output value generated by the potentiometer 103 when the unloading completion sensor 102 detects a completion of the unloading operation. That is, a difference between an actual output value of the potentiometer 103 and the output value generated by the potentiometer 103 when the unloading completion sensor 102 detects a completion of the unloading operation is the progress of the loading movement of the tape withdrawing mechanism. The tape winding side reel driving motor 105 and the tape supply side reel driving motor 104 are controlled so as to generate a desirable tape tension in accordance with the progress of loading movement of the tape withdrawing mechanism. Energizing voltage of the driving motor 106 is controlled in accordance with the progress of loading movement of the tape withdrawing mechanism. The microcomputer 100 measures the progress of unloading movement of the tape withdrawing mechanism on the basis of the output value of the potentiometer 103, and a reference or datum point of the progress of unloading movement of the tape withdrawing mechanism is an output value generated by the potentiometer 103 when the loading completion sensor 101 detects a completion of the loading operation, that is, a difference between an actual output value of the potentiometer 103 and the output value generated by the potentiometer 103 when the loading completion sensor 101 detects a completion of the loading operation is the progress of unloading movement of the tape withdrawing mechanism. In this embodiment, the progress of unloading movement of the tape withdrawing mechanism is not controlled in accordance with the elapsed time from the start of the loading-unloading movement of the tape withdrawing mechanism.

In FIGS. 20 to 23, a range A starts from a beginning of the loading movement or withdrawing the tape from the cassette 3 and ends just before the withdrawn tape 6 begins to contact the head drum 2. In a range $\Delta$, after the beginning of the loading movement in the range A, the driving motor 106 rotates at a low speed, because the tape begins to be wound on the tape guides. In a range other than the range $\Delta$ in the range A, the energizing voltage of the driving motor 106 is maintained at a high level to move the tape guides at a high speed and decrease a time required for the loading operation, because the tape 6, withdrawn from the cassette 3, extends substantially parallel to the tape 6 received in the cassette 3. In the range other than the range $\Delta$ in the range A, the tape tension generated by the tape winding side reel driving motor 105 and the tape supply side reel driving motor 104 is maintained as small as possible. In the range $\Delta$, the tension is maintained at a high level to keep a correct position of the tape 6 between the reels 4 and 5. The tape tension may be kept high before the beginning of the loading movement.

Figure 21:
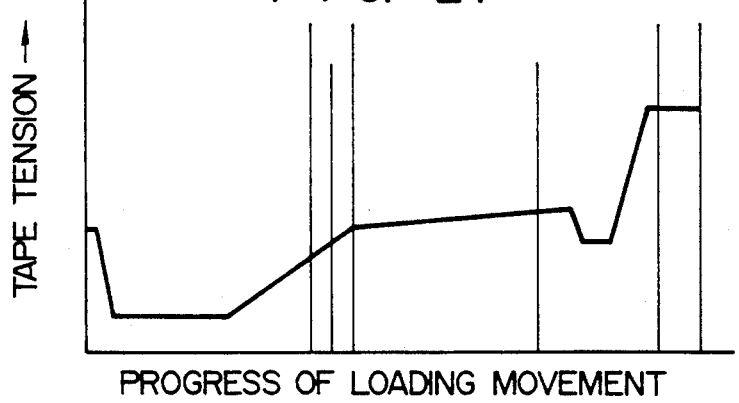
FIG. 21 is a graphical illustration of a relationship between a progress of loading movement of a tape withdrawing mechanism and a tape tension between reels, according to the present invention.
Figure 23:
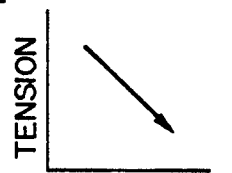
FIG. 23 is a graphical illustration of a relationship between a tape tension and a tape withdrawn speed from the reels according to the present invention.
Figure 22:
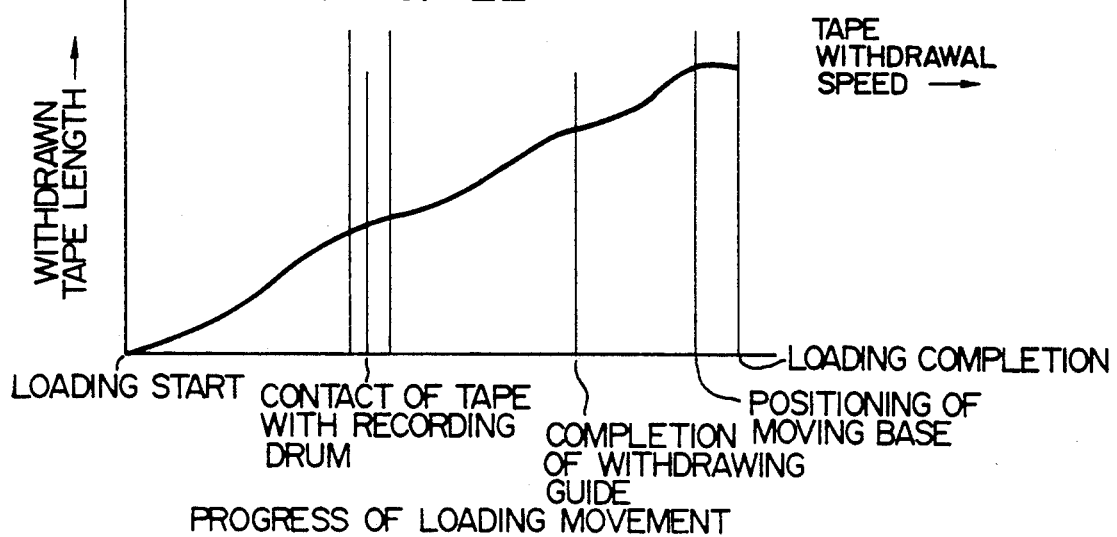
FIG. 22 is a graphical illustration of a relationship between the progress of loading movement of a tape withdrawing mechanism and a withdrawn tape length from the reels, according to the present invention.
Figure 24:
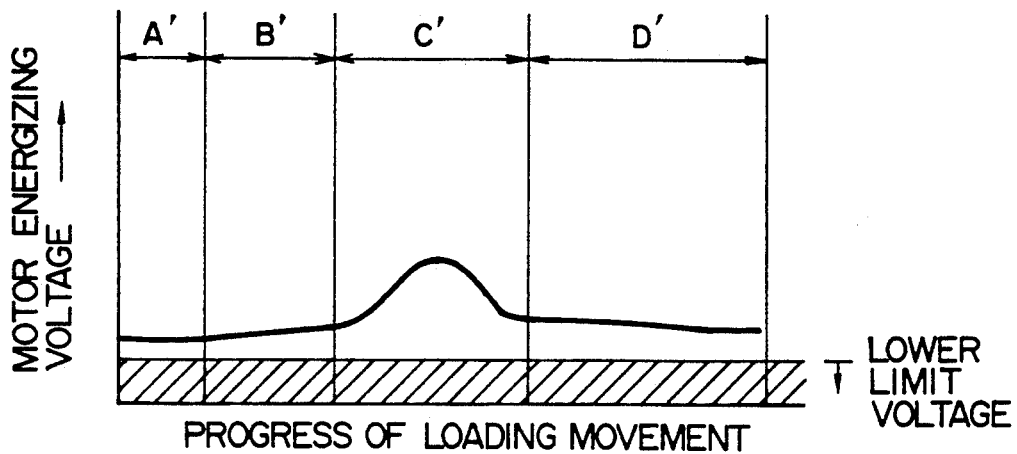
FIG. 24 is a graphical illustration of a relationship between a progress of unloading movement of the tape withdrawn mechanism and a voltage energizing the motor for driving the tape withdrawing mechanism in accordance with the present invention.
Figure 25:
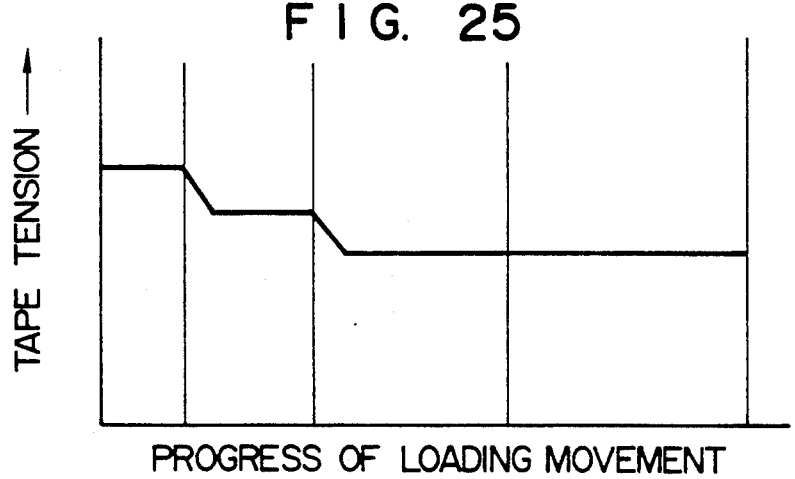
FIG. 25 is a graphical illustration of a relationship between the progress of unloading movement of the tape withdrawing mechanism and the tape tension between the reels according to the present invention.
Figure 27:
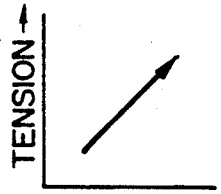
FIG. 27 is a graphical illustration of a relationship between the tape tension and a tape wound speed onto the reels in accordance with the present invention.
Figure 26:
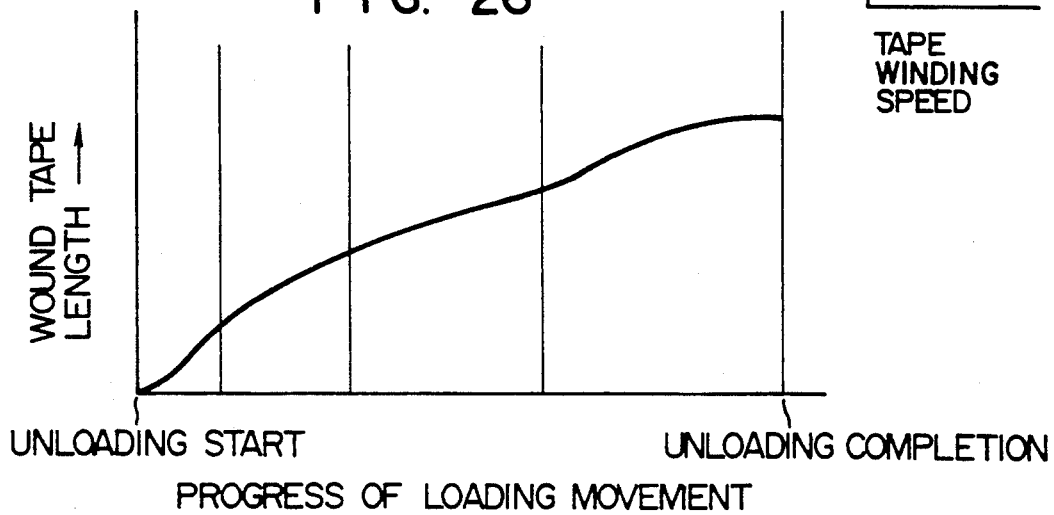
FIG. 26 is a graphical illustration of a relationship between the progress of unloading movement of the tape withdrawing mechanism and a wound tape length onto the reels according to the present invention.

In a range B, the tape 6 withdrawn from the cassette 3 begins to contact the head drum 2, and the tape tension is kept high in comparison with the tape tension in the range A to prevent a vibration of the tape 6 on the head drum 2. The tape tension may be gradually increased in the range A, as shown in FIG. 21.

In a range C, the tape tension is continuously kept high and the energizing voltage of the driving motor 106 is gradually decreased to decelerate the movement of the tape guides, so that a slack of tape 6 between the reels 4 and 5 is prevented when the tape supply side withdrawing guide and the tape wind side withdrawing guides 11 finish their movements. Just before the moving bases 19 and 20 reach their predetermined end positions, the tape tension is further increased and the movement of the tape guides is further decelerated. In a range D, the loading rings 51 and 57 continue to rotate after the bases 19 and 21 reach their predetermined end positions so that the moving bases 19 and 21 are pressed against their predetermined end positions through the spring. The energizing voltage of the driving motor 106 is increased against the spring force. The sensor 101 detects a completion of the loading operation.

In FIGS. 24-27, a range A' starts from a beginning of the unloading movement or winding of the tape onto the reels 4 and 5 in the cassette 3. In the range A', the energizing voltage of the driving motor 106 is kept low to keep the speed of the tape guides small and the tape tension is kept high so that a slack and disarrangement of the tape 6 on the head drum 2 is prevented.

In the range B', the energizing voltage of the driving motor 106 is continuously kept low to keep the speed of the tape guides small, but the tape tension is slightly decreased.

In the range C', the energizing voltage of the driving motor 106 is increased to accelerate the speed of the tape guides and the tape tension is slightly decreased.

In the range D', the tape 6 disengages from the head drum 2 and is entirely received in the cassette 3. The energizing voltage of the driving motor 106 is decreased to decelerate the speed of the tape guides and the tape tension is not decreased so that a slack and disarrangement of the tape 6 in the cassette 3 is prevented. The sensor 102 detects a completion of the unloading operation.

Figure 28:
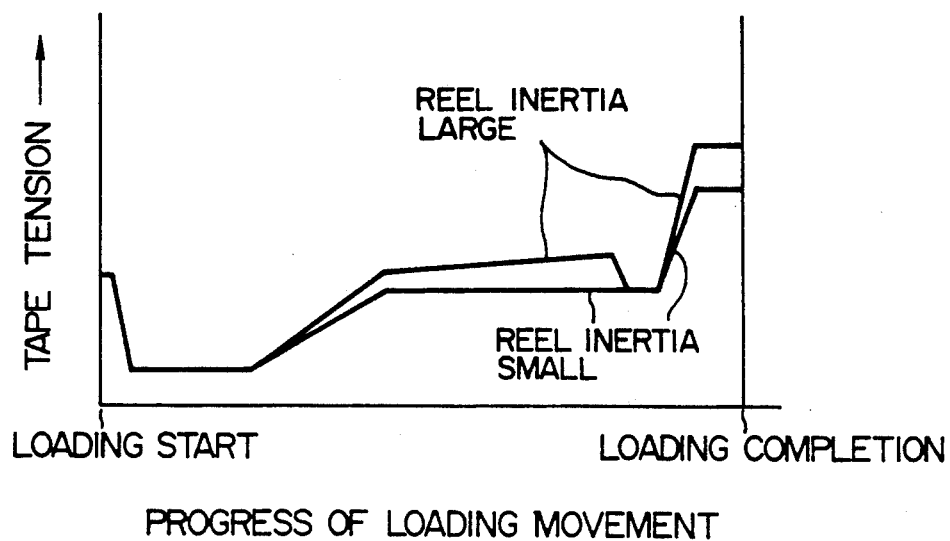
FIG. 28 is a graphical illustration of a relationship between a progress of the loading movement of the tape withdrawing mechanism and a tape tension in accordance with the present invention.
Figure 29:
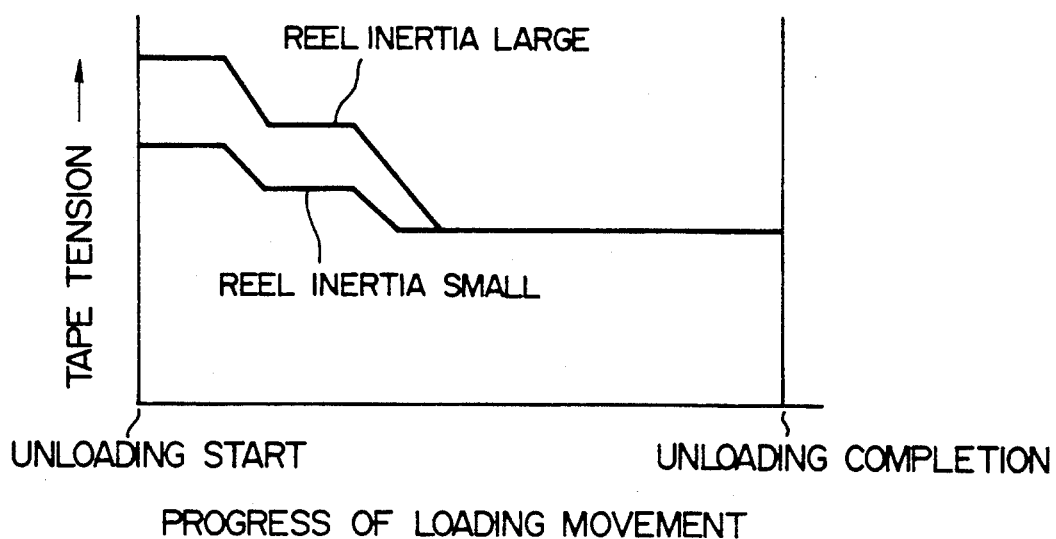
FIG. 29 is a graphical illustration of a relationship between a progress of unloading movement of the tape withdrawing mechanism and a tape tension in accordance with the present invention.

When there is a possibility that the cassettes 3 with various sizes thereof are used, a cassette size measuring device 110 may be combined with the tape loading device, as shown in FIG. 16. The tape tension, that is, the torque of the tape winding side reel driving motor 105 and the tape supply side reel driving motor 104 are changed in accordance with the measured cassette size so that the larger the inertia of the reels 4 and 5, the larger the tape tension, as shown in FIGS. 28 and 29.

What is claimed is:

1. A method for loading a tape onto a recording drum from a pair of reels on which the tape is wound and between which the tape extends, the method comprising the steps of:
    moving the tape between the pair of reels toward the recording drum and applying a first tension to the tape between the pair of reels, and
    increasing the tension of the tape between the pair of reels to a second tension when the tape begins to be brought into contact with the recording drum, with the second tension being larger than the first tension.

2. A method according to claim 1, wherein, in the step of moving and applying the first tension, the tension is gradually increased.

3. A method according to claim 1, further comprising the step of controlling a speed of the tape moved toward the recording drum in accordance with an elapsed time from a start of the step of moving the tape and applying the first tension.

4. A method according to claim 1, wherein a maximum speed of a tape withdrawal from the reels in the step of moving the tape and applying the first tension is greater than a speed of the tape withdrawn from the reels in the step of increasing the tension.

5. A method according to claim 1, further comprising the step of controlling a speed of the tape moved toward the recording drum in accordance with a progress of movement of the tape toward the recording drum.

6. A method according to claim 1, further comprising the step of, after the step of increasing the tension, winding the tape around the recording drum so that information can be recorded onto the tape or outputted therefrom, and a tension of the tape between the reels in the step of winding is greater than the first tension.

7. A method according to claim 1, further comprising, after the step of increasing the tensioning, the step of winding the tape around the recording drum so that information can be recorded onto the tape or outputted therefrom through the recording drum, and wherein a tension of the tape between the reels in the step of winding is larger than the tension of the tape in the step of increasing the tension.

8. A method according to claim 1, wherein the tension of the tape in the step of increasing the tension is adjusted in accordance with inertia of the reels receiving the tape so that the larger the inertia of the reels receiving the tape the larger the tension of the tape in the step of increasing the tension.

9. A method for loading a tape onto a recording drum, the method comprising the steps of:
    moving the tape toward a recording drum and applying a first tension to the tape, and increasing the tension when the tape begins to be brought into contact with the recording drum so as to provide a second tension greater than the first tension.

10. A tape loading device for loading a tape onto a recording drum, the tape loading device comprising:
    a pair of rotational reel spindles supporting respective reels on which the tape is wound in between which the tape extenso,
    spindle driving means for applying a torque to the reel spindles so that the tape between the reels runs on the recording drum and a tension is applied to the tape between the reels, and
    tape withdrawing means for withdrawing tape from the reels so that the tape between the reels moves toward the recording drum and contacts with the recording drum,
    wherein the spindle driving means applies a first tension to the tape between the reels when the tape withdrawing means move the tape between the reels toward the recording drum, the spindle driving means increase the tension of the tape from the first tension to a second tension greater than the first tension in when the tape does not contact the recording drum,
    and wherein the tape withdrawing means make the tape between the reels contact the recording drum with a third tension of the tape greater than the first tension.

11. A tape loading device according to claim 10, wherein the tension of the tape is gradually increased from the first tension to the second tension.

12. A tape loading device according to claim 10, wherein a speed of the tape moved toward the recording drum is controlled in accordance with elapsed time from a point in time when the driving spindle means applies the first tension.

13. A tape loading device according to claim 10, wherein the maximum speed of the tape withdrawn from the reels, when the driving spindle means applies the first tension is greater than a speed of the tape withdrawn from the reel when the tape withdrawing means makes the tape contact the recording drum.

14. A tape loading device according to claim 10, wherein a speed of the tape moved toward the recording drum is controlled in accordance with a progress of movement of the tape toward the recording drum.

15. A tape loading device according to claim 10, wherein the tape is wound around the recording drum so that information can be recorded onto the tape or outputted therefrom, and wherein a tension of the tape between the reels when the tape is wound around the surrounding drum is greater than the first tension.

16. A tape loading device according to claim 10, wherein the tape is wound around the recording drum so that information can be recorded onto the tape or outputted therefrom through the recording drum, and wherein a tension of the tape between the reels when the information is recorded or outputted is greater than tension of the tape when the tape withdrawing means make the tape between the reels contact the recording drum.

17. A tape loading device according to claim 10, wherein the tension of the tape in the third step is adjusted in accordance with inertia of the reels receiving the tape so that the greater the inertia of the reels receiving the tape, the larger the tension of the tape when the tape withdrawing means make the tape between the reels contact the recording drum.

* * * * *